US009450853B2

(12) United States Patent
Astigarraga et al.

(10) Patent No.: US 9,450,853 B2
(45) Date of Patent: Sep. 20, 2016

(54) SECURE CLOUD MANAGEMENT AGENT

(71) Applicant: International Business Machines Corporation, Armonk, NY (US)

(72) Inventors: Tara Astigarraga, Fairport, NY (US); Louie A. Dickens, Tucson, AZ (US); Michael E. Starling, Tucson, AZ (US); Daniel J. Winarski, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 274 days.

(21) Appl. No.: 14/055,503

(22) Filed: Oct. 16, 2013

(65) Prior Publication Data
US 2015/0106504 A1 Apr. 16, 2015

(51) Int. Cl.
| | |
|---|---|
| *G06F 15/173* | (2006.01) |
| *G06F 9/455* | (2006.01) |
| *H04L 12/26* | (2006.01) |
| *H04L 12/911* | (2013.01) |
| *H04L 12/24* | (2006.01) |

(52) U.S. Cl.
CPC ............ *H04L 43/16* (2013.01); *H04L 41/046* (2013.01); *H04L 41/28* (2013.01); *H04L 47/822* (2013.01); *H04L 41/0893* (2013.01); *H04L 43/0876* (2013.01)

(58) Field of Classification Search
CPC . H04L 41/046; H04L 41/28; H04L 41/0893; H04L 47/822; H04L 43/16; H04L 43/0876
USPC ....................................................... 709/224
See application file for complete search history.

(56) References Cited

U.S. PATENT DOCUMENTS

| | | | |
|---|---|---|---|
| 8,175,863 B1 | 5/2012 | Ostermeyer et al. | |
| 8,296,763 B1* | 10/2012 | Peercy | H04L 63/10 713/161 |
| 2012/0124211 A1 | 5/2012 | Kampas et al. | |
| 2012/0130781 A1 | 5/2012 | Li | |
| 2013/0262678 A1* | 10/2013 | Tung | G06F 9/5072 709/226 |
| 2013/0304904 A1* | 11/2013 | Mouline | H04L 43/045 709/224 |

OTHER PUBLICATIONS

Analog Devices, "Clock Generator with Dual PLLs, Spread Spectrum, and Margining," Data Sheet; AD9577, 2011, pp. 1-44.
Peter Mell, et al, "The NIST Definition of Cloud Computing (Draft): Recommendations of the National Institute of Standards and Technology," Special Publication 800-145, Computer Security, Jan. 2011, pp. 1-7.

(Continued)

*Primary Examiner* — Phuoc Nguyen
*Assistant Examiner* — Kishin G Belani
(74) *Attorney, Agent, or Firm* — Cantor Colburn LLP; William A. Kinnaman, Jr.

(57) ABSTRACT

A system for providing a secure management agent for high-availability continuity for cloud systems includes a computer processor and logic executable by the computer processor. The logic is configured to implement a method. The method includes receiving operating parameters and threshold settings for a plurality of computing clouds. Secure relationships are established with the plurality of computing clouds based on the operating parameters. Data is mirrored across the plurality of computing clouds. Threshold data is then monitored for the plurality of computing clouds to maintain a continuity of resources for the plurality of computing clouds.

7 Claims, 6 Drawing Sheets

(56) References Cited

OTHER PUBLICATIONS

Testimony of Cita M. Furlani, "Cloud Computing: Benefits and Risks of Moving Federal IT into the Cloud," National Institute of Standards and technology USDC, U.S. house of Representatives Committe on Oversight and Government Reform, Jul. 1, 2010, pp. 1-11.

List of IBM Patents or Patent Applications Treated as Related, (Appendix P), Filed Mar. 29, 2016, 2 pages.

Tara Astigarraga et al., "Secure Cloud Management Agent," U.S. Appl. No. 14/501,303, filed Sep. 30, 2014.

* cited by examiner

SECURE CLOUD MANAGEMENT AGENT

BACKGROUND

The present invention relates generally to cloud resource management, and more specifically, to providing a secure management agent for high-availability continuity for cloud systems.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. As the popularity and number of cloud computing providers increase, clouds have become a mainstay for the storage of computing and data storage, which may include the storage of mission critical data and their applications.

BRIEF SUMMARY

According to an embodiment of the present invention, a system for providing a secure management agent for high-availability continuity for cloud systems is provided. The system includes a computer processor and logic executable by the computer processor. The logic is configured to implement a method. The method includes receiving operating parameters and threshold settings for a plurality of computing clouds. Secure relationships are established with the plurality of computing clouds based on the operating parameters. Data is mirrored across the plurality of computing clouds. Threshold data is then monitored for the plurality of computing clouds to maintain a continuity of resources for the plurality of computing clouds.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
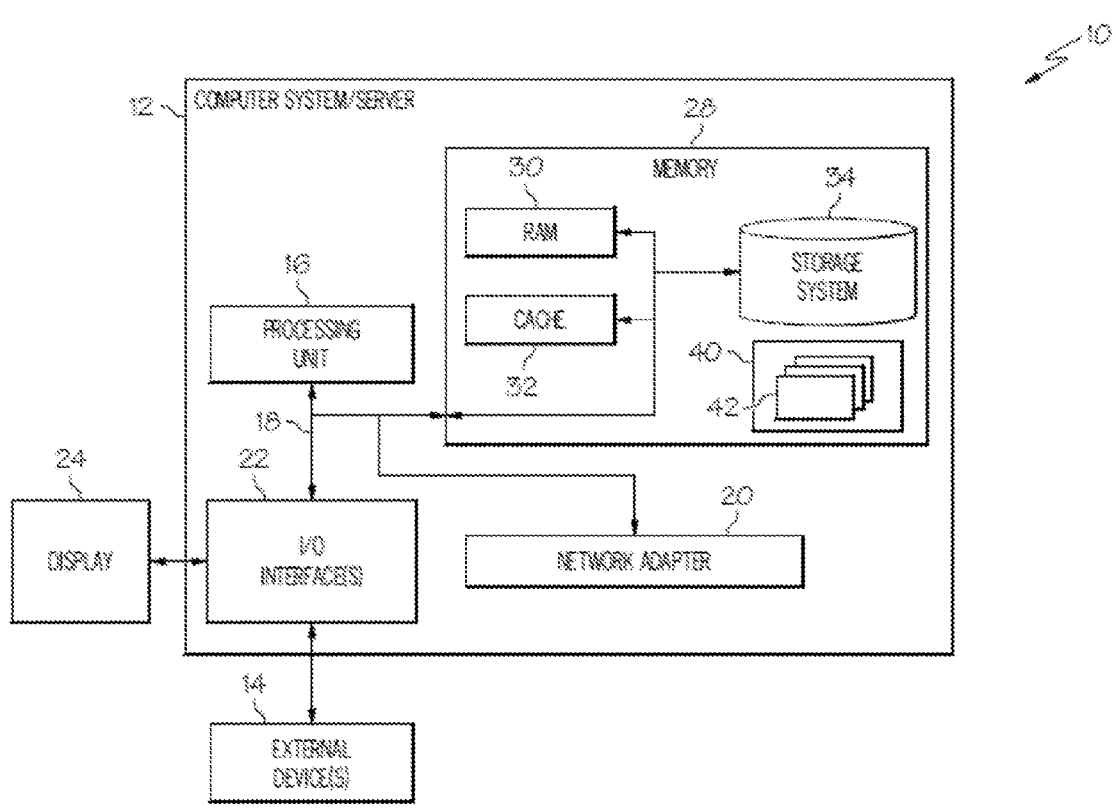
FIG. 1 depicts a cloud computing node according to an embodiment.

Embodiments disclosed herein are directed to providing a secure management agent for high-availability continuity for cloud system. An aspect of embodiments includes receiving operating parameters and threshold settings for a plurality of computing clouds (hereinafter "cloud" or "clouds"). Secure relationships are then established with the plurality of clouds based on the operating parameters and data is mirrored across the plurality of clouds. Threshold data is monitored for the plurality of clouds. Accordingly, the continuity of resources for the plurality of clouds is maintained.

With conventional cloud providers, if a user or business has data stored in a cloud or uses applications provided by the cloud, and the cloud goes down, the user or business will lose access to the data. In today's world, it is unacceptable for user and businesses to lose access to their data or their applications. In addition, cloud users may experience poor performance while accessing their clouds with conventional cloud providers. This can be due to either network congestion or cloud site workload. Additionally, with the continual evolution of computing clouds and storage clouds into more robust objects, which provide services to a broad range of customers and end users, reliable data security is a necessity. Without reliable data security, platforms for storage and computing will be vulnerable to disruptions.

An emerging model enables a company to outsource for computing and storage needs by contracting for cloud bandwidth to meet the needs of the business and eliminate the burden of data center management, internal data processing staff, and facility management generally associated with departmental information systems management. End users of cloud services are not typically concerned about the physical location of their data or computing power. However, proximity to the cloud and cloud services will have a measurable impact on response times and data transfer latency. The ability to securely connect to the closest access point and have your data and computing power assigned to your immediate operational cell becomes a performance and load balancing concern as well as a data security concern.

Embodiments disclosed herein prevent loss of access to data or applications provided by public or private clouds due to outages, poor performance (e.g., network congestion, cloud site workload), and data security breaches. Embodiments disclose a secure cloud management agent (SCMA) for managing, optimizing, monitoring, and modifying network configurations in a wide area network (WAN) and/or Internet so that a user may access a cloud system that meets their specified usage requirement. Particularly, the SCMA of embodiments may monitor data including, but not limited to:

Security management
Relationship management
Thresholds for performance, saturation, loads, response times
Policy management (e.g., burst mode, steady-state input/output (I/O), time sensitive windows of operation such as backup, alerts and alert status)
Predictive diagnostics
Cloud health monitoring/policies
Failover/Failback (i.e., trigger conditions)
Complex event processing of log entries/log management/alerts
Load Balancing
Distance monitoring/latency alerts
Path consistency
User or user group usages
Preemptive cloud management for code loads, patch installation, site maintenance, and the like Embodiments disclosed herein collect data from the SCMA monitors into a cloud management database (CMDB). The CMDB of an embodiment may store data elements collected from managing or monitoring data including, but not limited to:

Connections/connection security level status

Multi-path and multi-path status

Uniform resource locators (URLs) for cloud access (e.g., primary, secondary, shared)

Preferred paths/preferred URLs

Timestamp options/timestamp methodology

Generated I/O or packets for diagnostics/monitoring/ heartbeat/status reporting

Capacity monitoring (e.g., active connections, active paths, inactive connections, connection history, I/O traffic by connection)

Log entries/change state condition alerts

Load status/capacity monitoring with timestamps at change intervals.

User or user groups cloud usage

Max load/minimal load intervals with timestamps

According to embodiments, the SCMA may move large amounts of data, and therefore, may have multiple hardware assist remote copy engines installed in the clouds as well as in the SCMA.

It is understood in advance that although this invention includes a detailed description on cloud computing, implementation of the teachings recited herein are not limited to a cloud computing environment. Rather, embodiments of the invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of a cloud computing node for providing a secure management agent for high-availability continuity for cloud systems of an embodiment is shown. Cloud computing node 10 is only one example of a suitable cloud computing node and is not intended to suggest any limitation as to the scope of use or functionality of embodiments described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device, also referred to as a processing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 may include a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
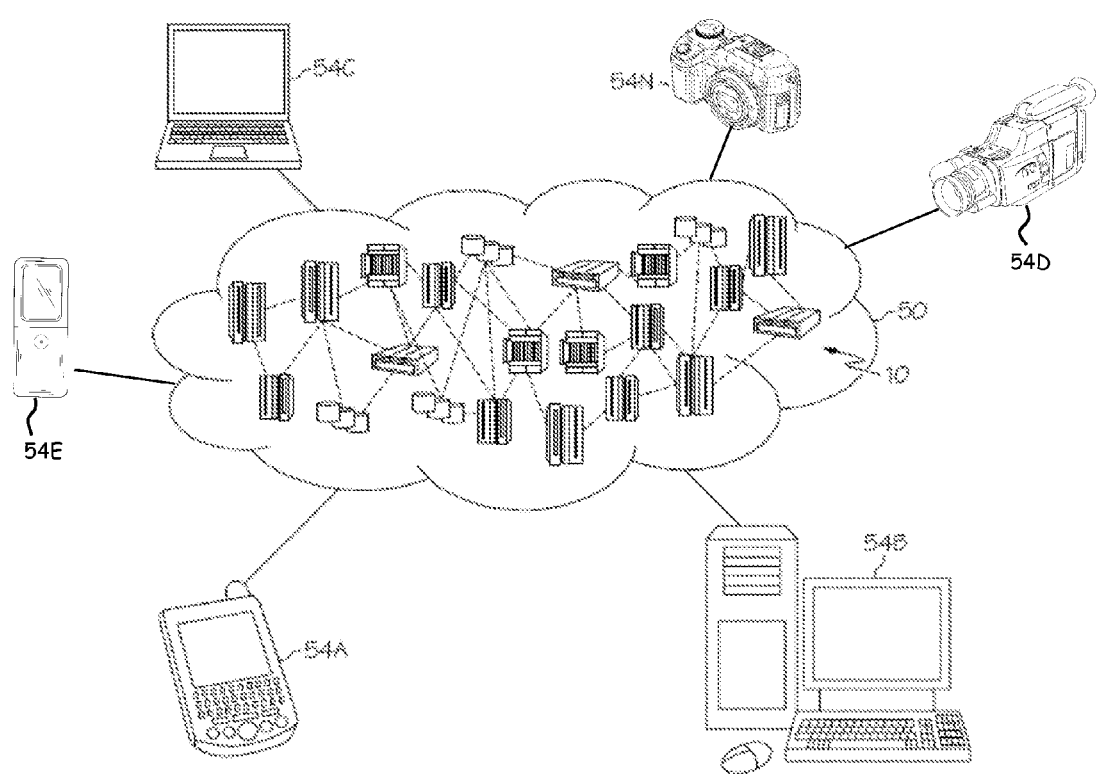
FIG. 2 depicts a cloud computing environment according to an embodiment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, digital video camera 54D, digital audio recording device 54E, and/or digital still camera 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
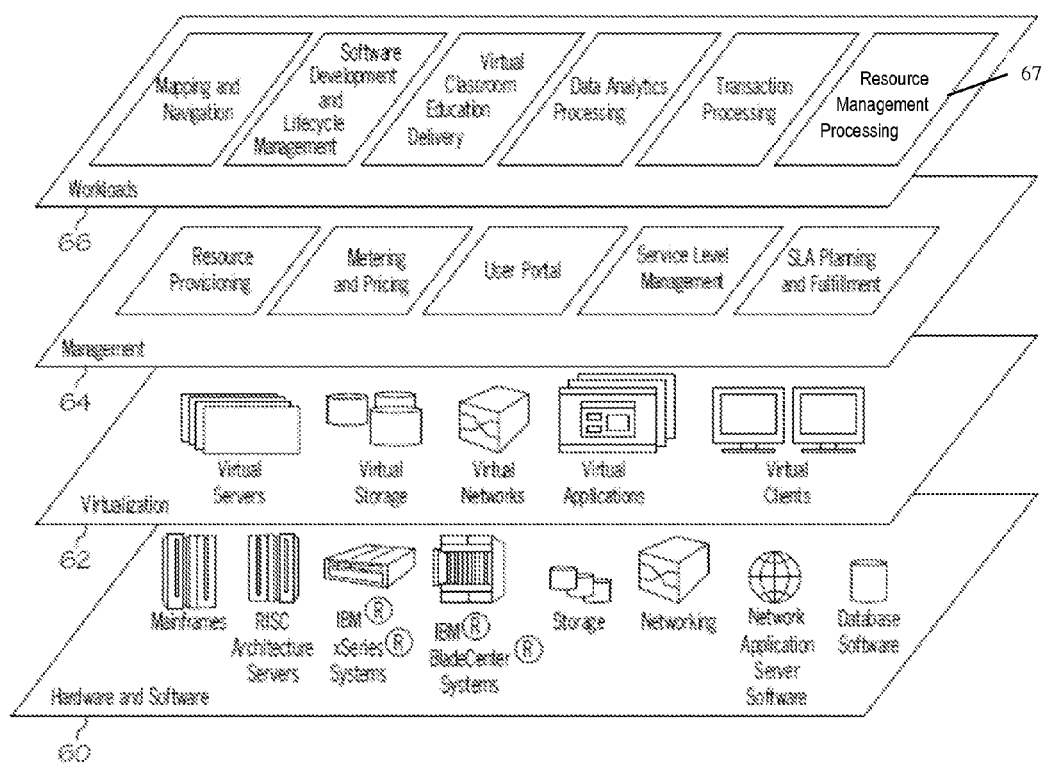
FIG. 3 depicts abstraction model layers according to an embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and resource management processing 67.

Figure 4:
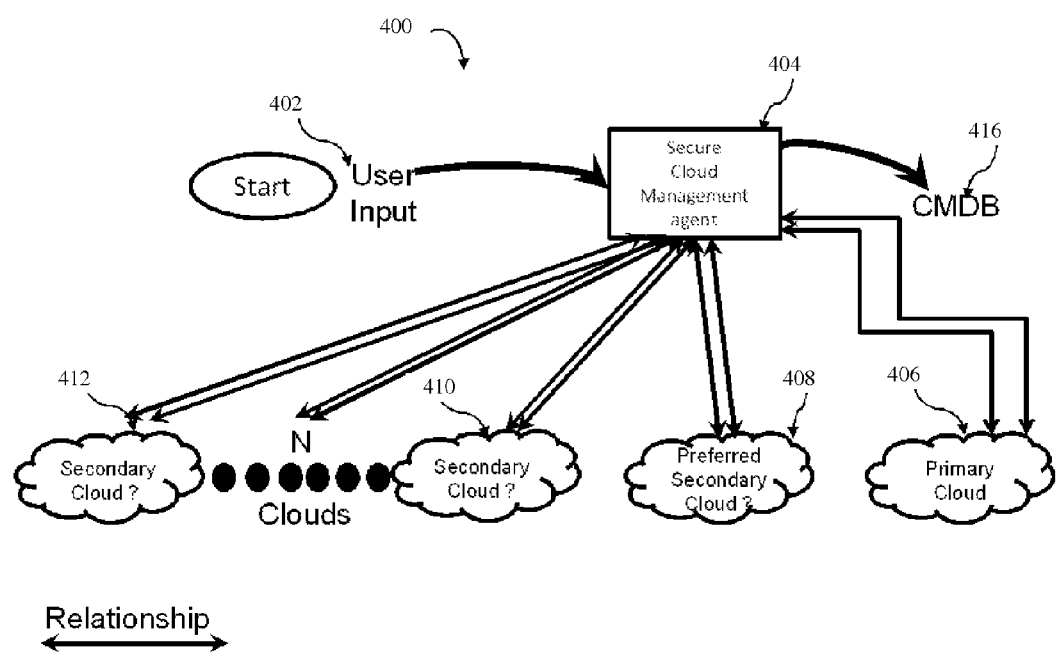
FIG. 4 depicts a cloud system that is established and monitored by a secure cloud management agent (SCMA) according to an embodiment.

FIG. 4 depicts a cloud system 400 that is established and monitored by a secure cloud management agent (SCMA) according to an embodiment. The cloud system 400 of an embodiment may include, but is not limited to, a user input module 402, a SCMA 404, a primary cloud 406, a preferred secondary cloud 408, N secondary clouds 410, 412, and a cloud management database (CMDB) 416.

According to an embodiment, an end user may input operating parameters and thresholds into the user input module 402 that the SCMA 404 will use to establish and monitor the cloud system 400. For example, the end user may input preferences including, but not limited to: (i) which cloud will serve as the primary cloud 406 (by providing an Internet protocol (IP) address for the primary cloud 406), (ii) whether multiple redundant paths should be used, (iii) whether there should be a preferred secondary cloud 408 (if so, by providing an IP address for the preferred secondary cloud 408), (iv) how many secondary clouds 410, 412 will be used (by providing IP addresses for each of the secondary clouds 410, 412), which security features will be used (e.g., IP security (SEC), Transport Layer Security, Secure Socket Layer), and threshold settings for various monitors (e.g., a policy manager, a performance manager, a cloud health monitor, preferred failover paths, and individual user authorizations or group user authorizations).

According to an embodiment, the SCMA 404 will utilize the end user input for managing, optimizing, monitoring, and modifying network configurations in a wide area network (WAN) and/or Internet so that the cloud system 400 meets the user's specified usage requirement.

Upon the initial power up of the SCMA 404, the CMDB 416 may be created and initialized with information from the various monitors according to an embodiment. The initial entry information may serve as an initial baseline until a more accurate baseline can be established by each of the monitors. In other words, the CMDB 416 of an embodiment stores historical data gathered from the various monitors for use in a predictive analysis of a health of the cloud system by the SCMA 404.

The primary cloud 406 of an embodiment is the main cloud for which the SCMA 404 will be providing services. The SCMA 404 will perform intensive business continuity efforts to keep at least one path open and operational at all times. If this is not possible, then the SCMA 404 will pick a new primary cloud 406 and failover. Prior to failover, the SCMA 404 will begin a process of keeping metadata, as well as the actual data, so the original primary cloud 406 can be restored once it is functional again according to an embodiment.

The preferred secondary cloud 408 may be defined and established by the end user through the SCMA 404. The preferred secondary cloud 408 may include different operating parameters and thresholds such as real-time mirroring. The performance monitor of an embodiment may select the preferred secondary cloud 408 based on the performance characteristics that are the closest match to the primary cloud 406.

According to an embodiment, the preferred secondary cloud 408 may have its own unique operating parameters and threshold values in the policy manager, performance manager, and cloud health monitor. This configuration is advantageous because it allows the system administrator to establish different policies for the preferred secondary cloud 408 than the other secondary clouds 410, 412. For example, if the preferred secondary cloud 408 was configured as a real-time mirror, and the performance of the preferred secondary cloud 408 was slowed by 100 milliseconds, the system administrator could be notified. On the other hand, it may be acceptable for the other secondary clouds 410, 412 to slow by 100 milliseconds since they are not real-time mirrors.

According to an embodiment, the cloud health monitor may be configured to notify the system administrator earlier, so proactive measures can be performed before a device or path experiences catastrophic failure. For example, transmission control protocol (TCP) packets can be dropped due to a network problem or device that is overloaded while receiving packets from other devices. Dropped packets are just one of many indictors of a network or device problem. Dropped packets must be re-driven and the cloud health monitor could be configured to notify the system administrator when the preferred secondary cloud 408 hits a threshold of 10 re-drives in a minute, whereas it might be acceptable for the other secondary clouds 410, 412 to have 100 re-drives a minute. This lower notification limit provides the system administrator with an early warning, so they could perform early preemptive actions before the preferred secondary cloud 408 goes down.

According to an embodiment, there may be 1 to N secondary clouds 410, 412 to mirror and backup the stored data and applications of the primary cloud 406, the preferred secondary cloud 408, or other secondary clouds 410, 412. According to an embodiment, the number N of secondary clouds 410, 412 may be selected by the end user in the user input module 402 (i.e., cloud configuration state). Each of the N secondary clouds 410, 412 will receive the same priority and preference. The SCMA 404 will provide services to each of them uniformly.

Figure 5:
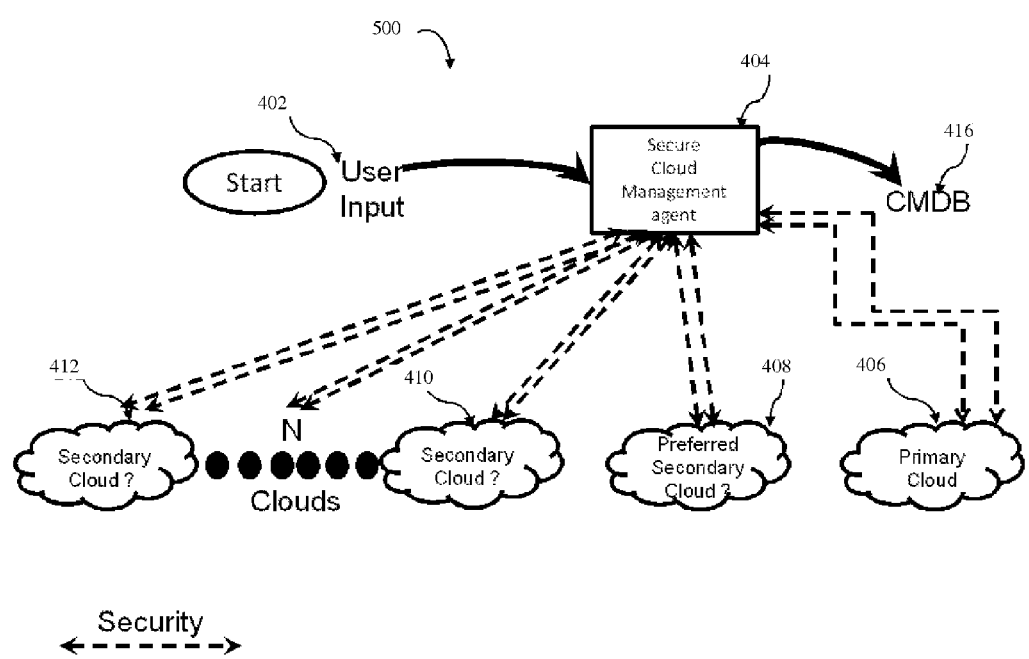
FIG. 5 depicts a cloud system for establishing and maintaining secure relationships according to an embodiment.

FIG. 5 depicts a cloud system 500 for establishing and maintaining secure relationships according to an embodiment. The cloud system 500 of an embodiment may include, but is not limited to, a user input module 402, a SCMA 404, a primary cloud 406, a preferred secondary cloud 408, N secondary clouds 410, 412, and a CMDB 416.

According to an embodiment, an end user may input security parameters and thresholds into the user input module 402 that the SCMA 404 will use to establish and monitor security relationships in the cloud system 500. According to an embodiment, an end user may input security preferences including, but not limited to: (i) what type of session layer security to implement (e.g., transport layer security, secure socket layer), (ii) what type of Layer 3 security to implement (e.g., IP SEC), (iii) a list of user identifications (IDs) who may access the data, (iv) list of user IDs who can update and monitor the user requirements, and (v) a list of user IDs who can administer and/or monitor the CMBD.

The SCMA 404 may establish a secure relationship down 1 to N paths from the SCMA 404 to the primary cloud 406 using known in the art security authentication procedures and protocols. The number of paths used between the SCMA 404 and the primary cloud 406 may be specified in the user input module 402. Once a secure relationship has been established the CMBD will be updated with the data, timestamp, and other pertinent security-related information. The secure relationship must be maintained at all times according to an embodiment. If any of the security relationships fail then, the CMDB 416 may perform whatever actions the administrator specified in the policy manager.

According to an embodiment, a secure relationship may be established down 1 to N paths from the preferred secondary cloud 408 to the SCMA 404 using known in the art security authentication procedures and protocols. The number of paths used between the preferred secondary cloud 408 and the SCMA 404 were specified in the user input module 402. Once a secure relationship has been established the CMBD will be updated with the data, timestamp, and other pertinent security related information. The secure relationship must be maintained at all times according to an embodiment. If any of the security relationships fails, then the CMDB 416 will perform whatever actions the administrator specified in the policy manager.

Similarly, according to another embodiment, a secure relationship may be established down 1 to N paths from 1 to N secondary clouds 410, 412 to the SCMA 404 using known in the art security authentication procedures and protocols. The number of paths used between the secondary clouds 410, 412 and the SCMA 404 may be specified in the use input module. Once a secure relationship has been established, the CMBD will be updated with the data, timestamp, and other pertinent security related information. The secure relationship must be maintained at all times according to an embodiment. If any of the security relationships fail then the CMDB 416 will perform whatever actions the administrator specified in the policy manager.

Figure 6:
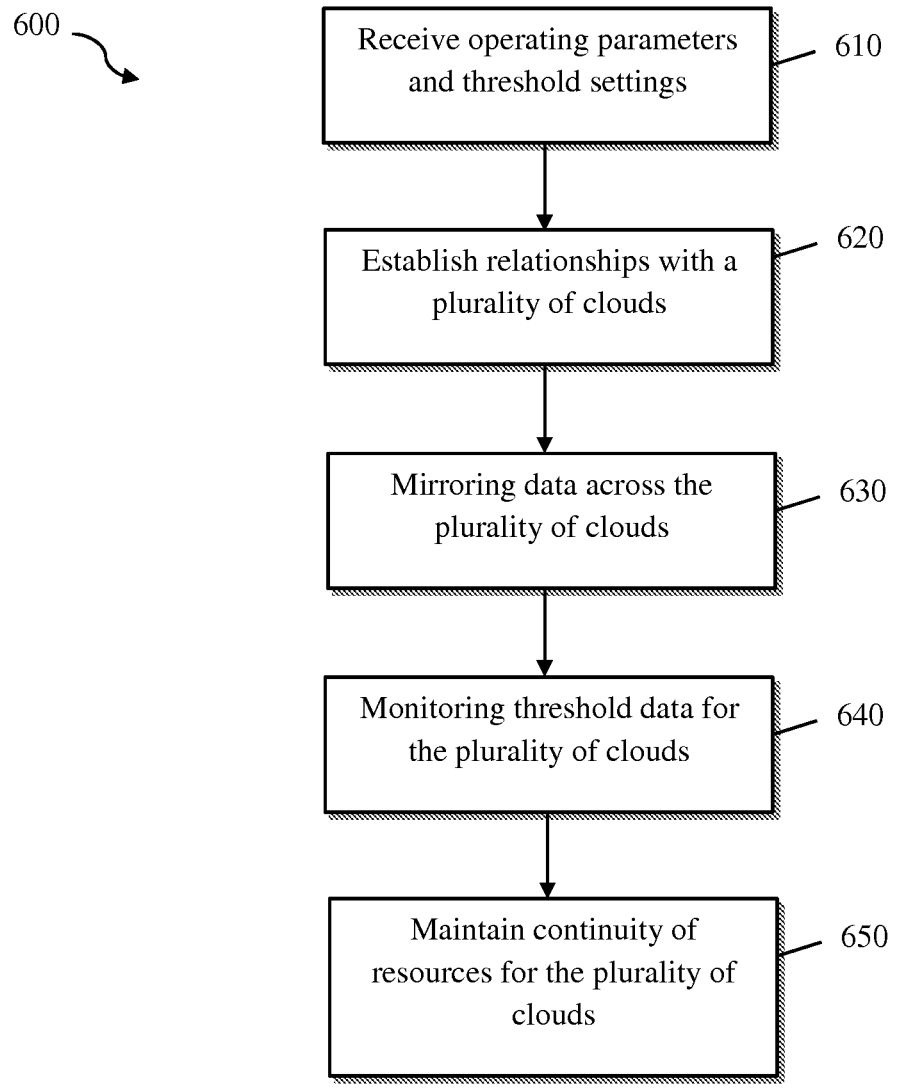
FIG. 6 depicts a process for establishing and maintaining secure relationships according to an embodiment.

FIG. 6 depicts a process 600 for establishing and maintaining secure relationships according to an embodiment. At block 610, the SCMA 404 receives operating parameters and threshold settings for a plurality of clouds inputted by an end user in the user input module 402. The SCMA 404 then establishes secure relationships with the plurality of clouds based on the operating parameters, as shown in block 620. At block 630, the SCMA 404 mirrors data across the plurality of clouds based on the inputted operating parameters. At block 640, threshold data is monitored for the plurality of clouds. At block 650, the continuity of resources for the plurality of clouds is maintained.

According to an embodiment, the maintaining of continuity includes failing over to the one or more secondary clouds responsive to a threshold setting for one or more of the clouds being exceeded. According to another embodiment, the maintaining of continuity includes storing the threshold data in a cloud management database and adapting and trending the plurality of clouds to prevent an outage based on the stored threshold data.

Technical effects and benefits include preventing loss of access to data or applications provided by public or private clouds due to outages, poor performance (e.g., network congestion, cloud site workload), and data security breaches. Embodiments disclose a SCMA for managing, optimizing, monitoring, and modifying network configurations in a WAN and/or Internet so that a user may access a cloud system that meets their specified usage requirement.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer system, comprising:
   a memory having computer readable computer instructions and a processor for executing the computer readable instructions to perform a method comprising:
   receiving operating parameters and threshold settings for a plurality of computing clouds;
   establishing secure relationships with the plurality of computing clouds based on the operating parameters;
   mirroring data across the plurality of computing clouds;
   monitoring threshold data for the plurality of computing clouds, wherein monitoring the threshold data comprises performing a predictive analysis of a health of the plurality of computing clouds based on historical data of the plurality of computing clouds; and
   maintaining continuity of resources by dynamically assigning pooled resources according to demand, wherein a consumer of resources may specify location of assigned resources only at a higher level of abstraction, without managing or controlling the underlying cloud infrastructure, for the plurality of computing clouds.

2. The computer system of claim 1, wherein the plurality of computing clouds comprises a primary cloud and one or more secondary clouds.

3. The computer system of claim 2, wherein the one or more secondary clouds further comprises a preferred secondary cloud, which is a real-time mirror of the primary cloud.

4. The computer system of claim 2, wherein the maintaining of continuity further comprises failing over to the one or more secondary clouds responsive to a threshold setting being exceeded.

5. The computer system of claim 1, wherein the maintaining of continuity further comprises:
   storing the threshold data in a cloud management database; and
   adapting the plurality of computing clouds to prevent an outage based on the stored threshold data.

6. The computer system of claim 1, wherein the operating parameters comprise at least one of which cloud will serve as the primary cloud, whether multiple redundant paths should be used, whether there is a preferred secondary cloud, how many secondary clouds will be used, and which security features will be used.

7. The computer system of claim 1, wherein the threshold settings comprise monitors for at least one of a policy manager, a performance manager, a cloud health monitor, a preferred failover path, and user authorizations.

\* \* \* \* \*